Feb. 5, 1957

H. M. ELSEY 2,780,743

ELECTRICAL BRUSH AND DYNAMOELECTRIC
APPARATUS EMBODYING THE SAME
Filed June 9, 1955

INVENTOR
Howard M. Elsey.
BY
Frederick Shapoe
ATTORNEY

United States Patent Office 2,780,743
Patented Feb. 5, 1957

2,780,743

ELECTRICAL BRUSH AND DYNAMOELECTRIC APPARATUS EMBODYING THE SAME

Howard M. Elsey, Oakmont, Pa., assignor to Westinghouse Electric Corporation, East Pittsburgh, Pa., a corporation of Pennsylvania Application June 9, 1955, Serial No. 514,319

12 Claims. (Cl. 310—228)

This invention relates to carbon brushes for dynamoelectric apparatus and dynamoelectric apparatus embodying such brushes.

It is well known that under certain adverse atmospheric conditions such, for example, as exist at high altitudes, where the water vapor pressure and oxygen pressure are low, that the carbon brushes employed on dynamoelectric apparatus wear and dust at an excessive rate so that the operation of the dynamoelectric apparatus may be seriously impaired. Thus, at altitudes of 40,000 feet and higher, where the air pressure may be less than 150 mm. of mercury and the moisture present may be so low that the dew point is —50° C. and lower, the operation of electrical motors and generators utilizing carbon brushes may be erratic or even cease functioning entirely because the carbon brushes may wear and dust away completely in a short period of time. In some instances, the brushes disintegrate so rapidly that a cloud of carbon dust surrounds the commutator or slip ring of the electrical machine, and the brushes may be completely worn away in a few minutes' operation.

It has been disclosed in my patent 2,414,514 that carbon brushes may be prepared with an admixture of certain metal halides such as lead iodide. Brushes so prepared have been found to cooperate with a copper commutator so that excessive wear and dusting are greatly reduced to the extent that the brushes will operate satisfactorily for thousands of hours at high altitudes.

It has been discovered that for the best operation of carbon brushes embodying metal halides under adverse atmospheric conditions, it is necessary that the carbon brush first operate in contact with the copper commutator for a substantial period of time of from the order of 2 to 16 hours under conditions corresponding to normal oxygen and water vapor pressure present at the earth's surface. A freshly dressed copper commutator appears to lack a copper oxide film of sufficient thickness and quality to enable the carbon brushes to operate thereagainst with the minimum of carbon brush wear and dusting. If a motor or a generator prepared with a freshly dressed commutator or slip ring and provided with carbon brushes containing a metal halide, is put into operation in aircraft and flown rapidly to altitudes of 30,000 feet and higher, there is little opportunity for the copper commutator or slip ring to build up the desirable copper oxide surface film. Under these conditions therefore, it has often occurred that the brushes will begin to dust and wear rapidly as extreme elevations are reached by the aircraft.

It will be appreciated that it is not feasbile at all times to operate electrical motors and generators in an aircraft structure for periods of up to 16 hours in order to produce on the commutator or slip ring a suitable film of copper oxide. Furthermore, even if it were possible to operate such motors for a sufficient period of time to produce the desired commutator film condition, such procedures are time-consuming, costly and subject to oversight or neglect, whereby the operation of the aircraft may be greatly endangered.

It is known to include in carbon brushes substances other than a metal halide serving to prolong the life of the carbon brush under conditions of low water vapor pressure and low oxygen pressure. Such additions may comprise any of numerous metal oxides and metal carbonates such, for example, as are disclosed in Patents 2,445,003 and 2,699,404. The effectiveness of metal oxides and metal carbonates ordinarily is not as substantial as with the metal halides in carbon brushes. Among other short comings, these brushes usually tend to overheat. It would be desirable to improve the effectiveness of the metal oxide and the metal carbonate additives in order that brushes embodying these latter compounds will be materially improved and rendered more reliable under extreme atmospheric conditions.

The object of this invention is to provide improved carbon brushes having a thin layer of predetermined thickness of a selected solid lubricant such as molybdenum disulfide disposed at or adjacent a side of the brush.

A further object of the invention is to provide a carbon brush embodying a metal compound serving to prolong the life of the brush under conditions of low water vapor and low oxygen pressure, in combination with a thin layer of a solid lubricant such as molybdenum disulfide, disposed across the full width of that side of the brush at right angles to the direction of relative motion of a commutator or slip ring with respect to the brush, the thin layer being substantially uniform from edge to edge of the brush and having a predetermined thickness.

A still further object of the invention is to provide a carbon brush embodying a metal compound serving to prolong the life of the brush under adverse conditions and having a thin layer of a solid lubricant such as molybdenum disulfide disposed across the full width of the leading side of the brush, the thin layer being substantially uniform from edge to edge of the brush and having a certain predetermined thickness.

Another object of the invention is to provide for applying a solid lubricant typified by molybdenum disulfide to the leading side of a carbon brush in order to enable the brush to operate satisfactorily at all times and under all atmospheric conditions.

Other objects of the invention will, in part, be obvious and will, in part, appear hereinafter. For a better understanding of the nature and objects of the invention, reference should be had to the following detailed description and drawing, in which.

Figure 1:
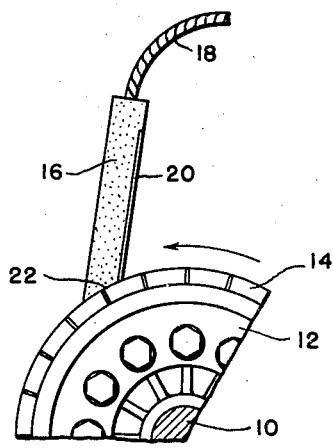
Figure 1 is a fragmentary view in elevation, partly in section, of a commutator and a carbon brush associated therewith.

I have discovered that highly satisfactory carbon brushes suitable for use with commutators and slip rings of dynamoelectric apparatus at all times and under all reasonably expected conditions of service particularly at extreme altitudes, may be prepared by applying a thin layer of a selected solid lubricant across the full width of the side of brush, the layer being substantially uniform from edge to edge of the brush and having a predetermined thickness. For this purpose molybdenum disulfide has proved to be an exceptionally effective solid lubricant.

Solid lubricants suitable for the practice of the present invention comprise at least one selected from the group consisting of the disulfides, diselenides and ditellurides of molybdenum, tungsten, titanium and zirconium. Examples of such solid lubricants are molybdenum disulfide, molybdenum diselenide, molybdenum ditelluride, tungsten disulfide, titanium disulfide and zirconium disulfide. Hereinafter the compound molybdenum disulfide will be specifically referred to, but it will be understood that it may be replaced, in part or in whole, by one or more of the other solid lubricant compounds of this group.

While it has been suggested heretofore to prepare brushes comprising molybdenum disulfide entirely or associated with carbon and the like, it has been found, and is well known in the art, that the brushes so prepared have been unsatisfactory. Ordinarily, a brush comprising entirely a mixture of molybdenum disulfide and carbon will be subject to a reaction between the carbon and the molybdenum disulfide at the commutator or slip ring surfaces, particularly if any sparking takes place, whereby molybdenum carbide results across most of the brush face. Molybdenum carbide is an extremely hard abrasive material. Commutators may wear away rapidly and the functioning of the brush may be unsatisfactory in such brushes.

I have discovered that a highly satisfactory brush may be produced if a relatively thin layer of molybdenum disulfide is applied, preferably on or at the leading side of the carbon brush, or in a slot closely adjacent to the leading side of the brush. Excellent results from such a carbon brush are obtained in practice without the conversion of the molybdenum disulfide to appreciable quantities of abrasive molybdenum carbide. The molybdenum disulfide present in the thin layer is wiped onto the commutator or slip ring in extremely small amounts and functions to prevent excessive wear of the carbon brush proper.

I have found that the layer containing the molybdenum disulfide should be of a thickness of from 0.005 to 0.08 inch per inch thickness of the brush between the leading side and the trailing side of the brush. This layer will comprise at least 25% by weight of the molybdenum disulfide, the balance ordinarily being some binder, such as cured resin. In practice, the thin layers that I have applied to the brush have comprised about 50% to 90% by weight of molybdenum disulfide and the balance being the binder. Outstanding results have been obtained when the thin layer was of a thickness of from 5 to 10 mils applied to a brush of a thickness of ¼ inch to 5/16 inch. If the brush is applied to aircraft which operates primarily at high altitudes, the thin layer of the molybdenum disulfide may have a greater thickness than 0.08 inch per inch thickness of the brush.

The thin layer of molybdenum disulfide has been found to produce little or no benefits if applied on the trailing side or disposed adjacent the trailing side of the brush. Since bad sparking occurs usually at the trailing edge it will cause decomposition of the molybdenum disulfide present in the thin layer. In many cases, the molybdenum disulfide in the thin layer at the trailing side may chip and such chips do not adhere to the commutator or slip ring, being thrown off by centrifugal effects.

Furthermore, it has been found important that the thin layer embodying the molybdenum disulfide be substantially uniform from edge to edge of the brush. If the thickness of the thin layer varies substantially, the effectiveness of the molybdenum disulfide is impaired and in many cases, at the portions where the molybdenum disulfide layer is heavier, grooving of the commutator may result with resulting poor commutation and other undesirable effects.

The thin layer of molybdenum disulfide may be applied to any type of carbon brush. As is well known, carbon brushes may comprise carbon alone or admixed with graphite or the carbon be entirely converted to graphite by a suitable graphitizing treatment. The carbon may contain a substantial proportion of a metal such as copper, silver or the like.

Standard carbon brushes of suitable shape and size may be readily provided with the thin layer of molybdenum disulfide by applying a suitable coating thereof in a resinous binder to the leading side and cured in an oven. A brush so prepared may be employed in dynamoelectric apparatus with highly satisfactory results in many applications on the earth's surface where operating conditions are severe.

The outstanding benefits of the present invention, however, are obtained when the thin layer of molybdenum disulfide is applied to a carbon brush containing from 0.5 to 50% by weight of a metal compound serving to prolong the life of the brush under conditions of low water vapor and oxygen pressure, such as occur at extreme altitudes. As disclosed in my Patent 2,414,514, carbon brushes may be prepared by impregnating them or otherwise incorporating throughout the body of the carbon brush a metal halide such, for example, as lead iodide, lead bromide, lead chloride, lead fluoride, calcium fluoride, barium fluoride, and the like. In many cases from 2% to 10% of the weight of the carbon brush may comprise the metal halide. Likewise, carbon brushes containing an admixture of metal oxides and metal carbonates such, for example, as lithium carbonate, barium oxide, strontium oxide, barium carbonate and magnesium carbonate, may be advantageously provided with a thin layer of the molybdenum disulfide at or adjacent the leading face of the brush. These last-mentioned brushes will function in a greatly improved manner by reason of the layer of the molybdenum disulfide not only when applied to a freshly dressed commutator, but also after the commutator has been adequately seasoned and a good film of copper oxide produced thereon.

The molybdenum disulfide or other solid lubricant of the group mentioned previously may be conveniently applied to the carbon brush or to carbon plates from which brushes are to be subsequently manufactured by forming a uniform groove or slot in the brush or plate at a location which will be adjacent the leading face of the brush, and filling the groove or slot with a mixture comprising a binder and the molybdenum disulfide.

Numerous resinous compounds may be employed as binders for the molybdenum disulfide. I have secured good results by employing varnishes of phenolic resins, however, numerous other resins such as furane resins, ureas, melamines and polyester resins, which will thermoset and cure when heated may be employed satisfactorily. The binder may be partly or wholly carbonized.

The following examples illustrate the practice of the present invention:

*Example I*

A carbon plate of a thickness of approximately ⅜ inch, 2 inches wide by 6 inches long was milled to provide a shallow groove 0.005 inch deep. The groove was disposed the full length of the bar leaving a ¼ inch wide ledge on each side thereof. The groove was filled with a paste comprising a mixture of 85 parts by weight of molybdenum disulfide ball milled to colloidal fineness and 115 parts by weight of a phenolic varnish. The phenolic varnish comprised 15 parts by weight of a thermosettable phenol-formaldehyde resin (the reaction product of one mol of cresol and 1.2 mols of formaldehyde) and 100 parts by weight of a volatile solvent. The plate with the coating of the molybdenum disulfide and phenolic varnish was passed into an oven and baked for 16 hours at 200° C. The baking drove off the solvent and cured the phenolic resin. The heat treatment decomposed and partly carbonized the phenolic resin, with loss of a portion of the phenolic varnish. The resulting layer comprised 85% of molybdenum disulfide and approximately 15% of partly carbonized cured phenolic binder. The carbon plate with the molybdenum disulfide was then passed under a grinder to remove any excessive of the molybdenum disulfide layer beyond the .005 inch depth of the original groove. Thereafter, the plate was split perpendicular to the applied coating and then cut crosswise to produce a plurality of brushes. Each brush was approximately 1 inch long by ½ inch wide across the leading side on which the molybdenum disulfide layer was present. After tapering the contact face of the brush, the coating or layer of molybdenum disulfide extended up the leading side of the brush for a distance approximately 1 inch from the contact surface or face of the brush. Thereafter, a copper lead was attached to the end of the brush.

Referring to Fig. 1 of the drawing, there is illustrated a brush corresponding to the preceding example applied to the commutator of a dynamoelectric machine. The dynamoelectric machine comprises a shaft 10 upon which is mounted suitable V-ring supports 12 for retaining commutator segments 14. The shaft 10 turns in a counterclockwise direction as indicated by the arrow. The brush 16 fitted with a flexible conductor 18 supplying electrical current thereto, is affixed at an angle to the diameter at its point of contact with the commutator. The leading side of the brush 16 is provided with a thin layer 20 containing molybdenum disulfide. The contact surface 22 of the brush operates against the commutator segments 14. In operation, the relative rotation of the segments 14 against the brush causes small quantities of the molybdenum disulfide from the thin layer 20 to be rubbed or wiped onto the commutator segments over the full width of the brush. The molybdenum disulfide so rubbed on provides the necessary lubrication which prevents excessive wear and deterioration of the carbon brush against clean copper such as is present in a freshly dressed commutator. During subsequent operation, a freshly dressed commutator will slowly build up a film of copper oxide which will enhance proper operation of the carbon brush against the commutator.

*Example II*

The leading side of a group of graphitized brushes of a thickness of ¼ inch and 5/16 inch was milled away to provide a uniform groove across the full leading side of each brush. The brush had been impregnated originally with 6% by weight of barium fluoride. The leading sides of some of the brushes of each thickness were grooved the entire width of the brushes at the edge of the contact face to a depth of 5 mils and others were grooved to a depth of 10 mils. The grooves were then filled with a paste comprising 85% by weight of molybdenum disulfide and 15% by weight of the phenolic resin solids in a varnish as set forth in Example I. The brushes were all baked at a temperature of 200° C. for 16 hours in order to cure and partly carbonize the phenolic binder. The brushes were then applied to commutators of dynamoelectric machines in which the copper segments had been freshly dressed to remove all surface oxides. The dynamoelectric machines were then operated under conditions corresponding to 50,000 feet altitude within any breaking in at ordinary room conditions. The brushes functioned satisfactorily without excessive wear, the wear not exceeding 0.33 mil per hour. Without the molybdenum disulfide film the wear rate would have been excessive and in some instances the brushes would have worn away in several hours unless broken in by running for many hours at earth's surface conditions.

*Example III*

A graphitized carbon brush for a slip ring was prepared by milling away a groove to a depth of 5 mils across the full width of the leading edge thereof. The brush was of a thickness of ¼ inch and a width of ¾ inch. The brush had been prepared with 6% barium fluoride distributed throughout the carbon body. The milled groove was then filled with a paste comprising 45% by weight of molybdenum disulfide and 55% by weight of a phenolic varnish (the varnish comprised 15% phenolic resin and 85% volatile solvent). The brush so treated was then baked in an oven at 200° C. to cure the phenolic resin.

Figure 2:
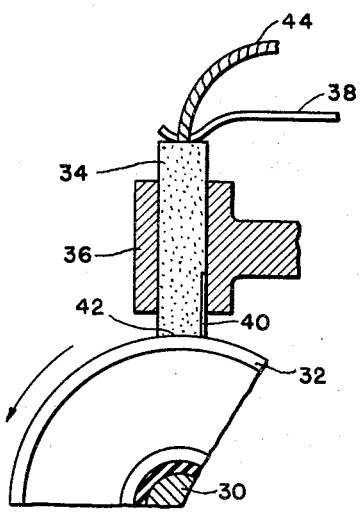
Fig. 2 is a view in elevation, partly in section, of a slip ring and a carbon brush associated therewith.

Fig. 2 illustrates the application of the brush of this Example III to a slip ring as illustrated. The dynamoelectric machine of Fig. 2 comprises a shaft 30 on which is mounted a slip ring 32. A brush 34, prepared as described in this Example III, is disposed within a holder 36 enabling the brush to be maintained in contact with the slip ring 32 by the pressure imparted through the spring 38. The thin layer 40 comprising molybdenum disulfide extends over the entire leading side of the brush. The contact surface of the brush 42 operates in sliding contact with the slip ring 32 in order to take off electrical current generated by the dynamoelectric machine, which current is passed to the lead 44. The layer of molybdenum disulfide on the leading side will impart a thin but effective coating of molybdenum disulfide over the entire width of the surface of the slip ring 32 coming in contact with the brush 34. The quantity of molybdenum disulfide applied to the slip ring 32 is sufficient to insure good lubrication without causing any appreciable formation of harmful compounds such as carbides. A slip ring structure similar to that illustrated in Fig. 2 was tested at altitudes of up to 60,000 feet and found to wear satisfactorily, the wear rate being less than 1 mil per hour of operation at high current densities of up to 180 amperes per square inch of contact surface.

*Example IV*

A carbon brush is impregnated with calcium acetate solution and then heated to a temperature of 300° C. for several hours, whereby the brush is impregnated with calcium carbonate in an amount equal to 7.5% of the weight of the carbon. Thereafter, the leading side of the brush is cut away to provide a groove of a depth of 0.010 inch extending over the full width of the leading side of the brush. The groove is filled with a mixture of molybdenum disulfide and a resin binder. The brush is then heated in an oven to drive off the solvents, and to cure and partially carbonize the binder. The brush is then ground to level the thickness of the applied molybdenum disulfide layer so that the brush will slide smoothly within its brush holder. The brush so prepared is suitable for use under high altitude conditions with normal wear and no dusting resulting. The brushes containing calcium carbonate without any molybdenum disulfide have been found to function erratically against commutators. In some cases, after a service for many hours in electrical machines, brushes containing calcium carbonate will fail by dusting and wearing excessively. Tests have indicated that at times extremely high temperatures occur in these brushes. However, when a 10 mil thick layer of molybdenum disulfide is applied to the brushes containing calcium carbonate, no high temperature peaks in the brushes have been found over many hours of testing. Furthermore, the calcium carbonate containing brushes with a molybdenum disulfide layer thereon function satisfactory at all times and in no case have they worn excessively or disintegrated.

*Example V*

A graphitized carbon plate was treated with lithium carbonate in an amount equal to 8% of the weight of the carbon body. The carbon plate is then milled to provide a groove to a depth of 8 mils and the groove is filled with an excess of a paste comprising a phenolic resin and molybdenum disulfide. The plate is placed in a furnace and heated at 200° C. for several hours to cure the binder and partially carbonize it. The layer contained 80% by weight of molybdenum disulfide. After grinding the layer of molybdenum to a uniform thickness, the plate is cut into a plurality of carbon brushes. When the carbon brushes are installed in a machine, they will function satisfactorily at elevations corresponding to 50,000 feet altitude with normal wear of less than 1 mil per hour operation.

Figure 3:
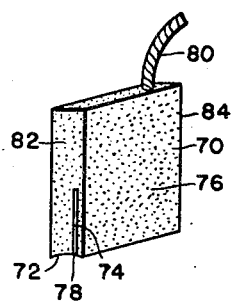
Fig. 3 is a perspective view of another form of carbon brush.

While the best results have been obtained by applying the thin layer of molybdenum disulfide on the leading surface of the brush, grooves may be cut into the brush adjacent the leading side and the molybdenum disulfide disposed therein with beneficial results. Such a construction is shown in Fig. 3 of the drawing, wherein the brush 70 having a contact surface or face 72 is provided with a slot 74 adjacent to the leading side 76 of the brush, the slot extending the full width of the brush from edge 82 to edge 84. The groove is filled with molybdenum disulfide 78, preferably with a binder, the binder being heat treated to cure it. Thereafter, a flexible connection 80 is attached to the brush.

The molybdenum disulfide or other solid lubricant employed in practicing the invention is a highly purified material substantially free from abrasives. Ordinarily, the molybdenum disulfide will be finely divided, preferably of a fineness to pass through a sieve having 200 meshes to the lineal inch. I have secured good results using molybdenum disulfide which was ball milled for several hours whereby it is reduced to a fineness such that the average particle size is less than 5 microns in diameter. Mixtures of molybdenum disulfide and tungsten disulfide, for instance, may be employed with satisfactory results.

It will be appreciated that the carbon brushes with several additives may be prepared by impregnating them with a metal halide such as 6% by weight of barium fluoride and thereafter impregnated with calcium acetate which upon being heat treated decomposed to produce calcium carbonate equal to 4% of the weight of the brush. Brushes containing two or more of such metal compounds serving to prolong the life of the brush may be then provided with a thin layer of the solid lubricant such as molybdenum disulfide. Brushes so prepared will be effective under any reasonably conceivable operating conditions both on the earth's surface and at high altitudes.

It will be understood that the description and drawing are exemplary.

I claim as my invention:

1. An electrical contact brush for operating in sliding contact with a conducting surface, comprising a body of carbon and admixed therein an amount of from 0.5% to 50% of the weight of the body of at least one metal compound serving to prolong the life of the brush under conditions of low water vapor and oxygen pressure, and a thin layer disposed at and across the full width of that face of the brush substantially at right angles to the direction of relative sliding movement of the brush to the conducting surface, the thin layer being substantially uniform from edge to edge of the brush, the thin layer being of a thickness not exceeding 0.08 inch per inch thickness of the brush between the leading side and trailing side of the brush, the thin layer extending a substantial distance upwardly from the contact surface of the brush in contact with the sliding surface, the thin layer comprising a binder and at least 25% of the weight of the layer of at least of molybdenum disulfide.

2. The brush of claim 1, wherein at least a part of the molybdenum disulfide is replaced by at least one solid lubricant compound selected from the group consisting of the disulfides, diselenides, and ditellurides of molybdenum, tungsten, titanium and zirconium.

3. The electrical contact brush of claim 1 wherein the thin layer is disposed on the leading side of the brush.

4. The electrical contact brush of claim 1, wherein the thin layer comprises a binder of carbonized phenolic resin.

5. The electrical contact brush of claim 1, wherein the compound serving to prolong the life of the brush comprises from 1% to 10% by weight of barium fluoride.

6. An electrical contact brush for operating in sliding contact with a conducting surface, comprising a body of carbon and admixed therein an amount of from 0.5% to 50% of the weight of the body of at least one metal compound serving to prolong the life of the brush under conditions of low water vapor and oxygen pressure, the compound selected from the group consisting of the halides, oxides and carbonates of a metal, and a thin layer disposed at and across the full width of that side of the brush substantially at right angles to the direction of relative sliding movement of the brush to the conducting surface, the thin layer being substantially uniform from edge to edge of the brush, the thin layer being of a thickness not exceeding 0.08 inch per inch thickness of the brush between the leading side and trailing side of the brush, the thin layer extending a substantial distance upwardly from the contact surface of the brush in contact with the sliding surface, the thin layer comprising a binder and at least 25% of the weight of the layer of molybdenum disulfide.

7. The contact brush of claim 6 wherein the molybdenum disulfide is replaced at least in part by at least one solid lubricant compound selected from the group consisting of the disulfides, diselenides, and ditellurides of molybdenum, tungsten, titanium and zirconium.

8. An electrical contact brush for operating in sliding contact with a conducting surface comprising a body comprising carbon and a thin layer disposed across the full width of the brush substantially at right angles to the direction of relative sliding movement of the brush to the conducting surface, the thin layer being substantially uniform from edge to edge of the brush, the thin layer extending a substantial distance from the contact surface of the brush, and the thin layer comprising molybdenum disulfide.

9. The contact brush of claim 8 wherein the thin layer includes a thermoset phenolic resin binder for the molybdenum disulfide, the molybdenum disulfide comprising at least 25% of the weight of the thin layer.

10. The contact brush of claim 8 wherein the thin layer has a thickness of between 5 and 80 mils per inch of thickness of the brush between the leading side and the trailing side.

11. In a dynamoelectric machine, a metallic current collector, a carbon brush disposed in sliding contact with the metallic current collector, the carbon brush comprising a thin layer disposed at and across the full width of the leading side of the brush, the thin layer being substantially uniform from edge to edge of the brush, the thin layer extending a substantial distance from the surface of the brush in contact with the metallic current collector, the thin layer being of a thickness of from 0.005 to 0.08 inch per inch thickness of the brush from the leading side to the trailing side, and the thin layer comprising at least 25% of its weight of a solid lubricant selected from the group consisting of at least one of the group consisting of the disulfides, diselenides, and ditellurides of molybdenum, titanium, tungsten and zirconium.

12. The dynamoelectric machine of claim 11, wherein the carbon brush comprises a body of carbon admixed with from 0.5% to 50% of its weight of at least one metallic compound serving to prolong the life of the brush, the metal compound being selected from the group consisting of the halides, oxides and carbonates of a metal.

References Cited in the file of this patent

UNITED STATES PATENTS

| 2,414,514 | Elsey | Jan. 21, 1947 |
| 2,414,543 | Moberly | Jan. 21, 1947 |
| 2,656,475 | Diehl | Oct. 20, 1953 |